United States Patent [19]
Johnson

[11] Patent Number: 5,761,351
[45] Date of Patent: Jun. 2, 1998

[54] WAVELENGTH-ADDRESSABLE OPTICAL TIME-DELAY NETWORK AND PHASED ARRAY ANTENNA INCORPORATING THE SAME

[75] Inventor: Bartley C. Johnson, Clayton, Mo.

[73] Assignee: McDonnell Douglas Corporation, St. Louis, Mo.

[21] Appl. No.: 679,775

[22] Filed: Jul. 15, 1996

[51] Int. Cl.$^6$ .............................. G02B 6/26; H01Q 21/00
[52] U.S. Cl. .................... 385/15; 385/16; 385/22; 385/24; 385/45; 343/853; 359/331; 359/128
[58] Field of Search ................ 385/15–24, 31, 385/42, 45; 359/115, 127, 128, 331; 343/850, 853

[56] References Cited

U.S. PATENT DOCUMENTS

| | | | |
|---|---|---|---|
| 4,296,319 | 10/1981 | Franks et al. | 250/227 |
| 4,671,604 | 6/1987 | Soref | 350/96.15 |
| 4,959,540 | 9/1990 | Fan et al. | 250/227 |
| 5,013,979 | 5/1991 | Birleson | 342/375 |
| 5,044,715 | 9/1991 | Kawachi et al. | 385/42 |
| 5,074,634 | 12/1991 | Takahashi | 359/127 |
| 5,179,604 | 1/1993 | Yanagawa et al. | 385/24 |
| 5,414,433 | 5/1995 | Chang | 342/375 |
| 5,428,218 | 6/1995 | Toughlian et al. | 250/227.12 |

OTHER PUBLICATIONS

"Optically Generated True-Time Delay in Phased-Array Antennas," Frigyes and Seeds, IEEE Transactions on Microwave Theory and Technique, vol. 43, No. 9, Sep. 1995.

"True Time-Delay Fiber-Optic Control of an Ultrawideband Array Transmitter Receiver with Multibeam Capability," Frankel and Esman, IEEE Transactions on Microwave Theory and Techniques, vol. 43,No. 9, Sep. 1995.

Primary Examiner—Phan T. H. Palmer
Attorney, Agent, or Firm—Robert Westerlund

[57] ABSTRACT

An optical switch network which includes a plurality N of cascaded optical switching stages, each mth one of the switching stages including $2^{m-1}$ Mach-Zehnder interferometers, where m=1 through N. The input port of the Mach-Zehnder interferometer of a first one of the optical switching stages receives an optical input signal, and the $2^{N-1}$ Mach-Zehnder interferometers of the Nth one of the optical switching stages provide a total of $2^N$ output ports. Each of the Mach-Zehnder interferometers is preferably an unbalanced Mach-Zehnder interferometer, and the optical input signal preferably has a wavelength which is a selected one of $2^N$ selectable wavelengths. The plurality N of cascaded optical switching stages provide $2^N$ possible optical paths, whereby the optical input signal is automatically routed along a selected one of the $2^N$ possible optical paths in dependence upon its selected wavelength. Also disclosed is an optical time delay network comprised of an optical switch network as described above, and a plurality $2^N$ of optical delay lines of different lengths coupled to respective ones of the $2^N$ output ports of the Nth one of the optical switching stages, each of the optical delay lines being comprised of an optical waveguide having a light-reflecting end, whereby the optical input signal is automatically routed from the input port of the first one of the optical switching stages to a selected one of the $2^N$ output ports of the Nth one of the optical switching stages, and thence, into a respective one of the $2^N$ optical delay lines, in dependence upon its selected wavelength, whereby the optical time delay network is wavelength-addressable. Also disclosed is a phased array antenna which includes a plurality of optical time delay networks like the one described above, whereby a beam produced by the antenna elements of the phased array antenna has a beam angle which is a selected one of $2^N$ selectable beam angles, in dependence upon the wavelength of the optical input signal.

18 Claims, 5 Drawing Sheets

WAVELENGTH-ADDRESSABLE OPTICAL TIME-DELAY NETWORK AND PHASED ARRAY ANTENNA INCORPORATING THE SAME

BACKGROUND OF THE INVENTION

The present invention relates generally to optical time-delay networks, and more particularly, to a wavelength-addressable time-delay network that has particular utility in phased array antennas, such as those used in satellite communications systems and true-time delay radar systems.

Phased array antennas have a multiplicity of individual radiating or antenna elements which are geometrically configured to provide a desired antenna coverage, e.g., the antenna elements may be arranged in a one-dimensional linear array, a two-dimensional planar array, or a three-dimensional circular array. Each of the antenna elements is driven or excited by RF power supplied by a feed network which splits the power from a common RF source and distributes the RF power at controlled relative phases (and sometimes, amplitudes) to the individual antenna elements, to thereby form a beam having a desired shape/profile (far-field radiation pattern) and pointing direction. The beam produced by the excitation of the antenna elements may be electronically steered to different beam angles by controllably varying the phase or time delay of the RF waves delivered to the individual antenna elements. A thorough explanation of the principles of operation of phased array antennas and beam forming and steering techniques can be found in the textbook *Radar Handbook*, by Merrill I. Skolnik (McGraw Hill, 1970), the teachings of which are herein incorporated by reference.

The above-described feed networks for forming and steering the beam produced by a phased array antenna are generally referred to as beam forming and steering networks (BFSNs). Such BFSNs utilize phase shift networks or time delay networks to controllably vary the phase or time delay of the RF waves delivered to the individual antenna elements in order to form and steer the beam(s) produced by the antenna array.

Conventional phased array antennas typically include a bank of variable phase shifter devices which are electronically adjustable to thereby impart a selected phase shift to the RF waves fed to the respective antenna elements. True-time-delay phased array antennas typically require a plurality of electronically controllable variable time delay lines to impart a selected time delay to the RF waves fed to the respective antenna elements. Antennas which employ a BFSN which utilize a phase shift network can thus be considered to be "phase steered", and antennas which employ a BFSN which utilize a time delay network can thus be considered to be "time steered". The electronically controllable RF delay line technology required for true-time-delay phased array antennas is still in its infancy. Many optical techniques are being considered for implementing this technology because of the ease of creating time delays from picoseconds to many nanoseconds and beyond using manageable lengths of optical fiber. The RF signal is used to modulate a laser beam. The RF-modulated light (lightwave signal) is delayed in a length of optical fiber, typically in the centimeter to meter range. The delayed lightwave signal is then converted back to an electrical RF signal using an optical detector.

Conventional phased array antennas employ BFSNs which typically utilize electrical waveguides, delay lines, and phase shifters for transmitting and phase-shifting or time-delaying the RF signals, which are typically microwave or millimeter wave signals. A significant drawback of conventional phased array antennas is that they have an inherently narrow RF bandwidth. Moreover, if the array is fed by wideband (broadband) RF signals and a constant phase shift is produced from element to element of the array, the beam pointing direction is different for different frequency components of the wideband RF signals, a phenomenon referred to as "beam squinting". This effect is even more pronounced if phased arrays in more than one frequency band utilize a common feed network.

In principle, beam squinting can be eliminated through the use of variable delay lines instead of variable phase shifters. However, new types of electronically controllable RF delay lines are required to make this possible, as mechanically varied delay lines are too slow for rapid beam pointing applications, and other electrical delay line types are dispersive, i.e., the delay they impart is frequency-dependent (i.e., not "true"). Optical beamforming systems based on optical fiber technology combine the advantages of low dispersion and rapid, electronically controllable switching of delay times.

In optical beamforming systems, RF-modulated optical signals (lightwaves) are transmitted and delayed via optical fibers (or other types of optical waveguides), and opto-electronically converted back to electrical RF signals prior to driving the antenna elements (radiators). Several types of optical time delay networks have been proposed which have the capability to impart variable time-delays to wideband optical signals, thereby making possible a practical realization of a wideband steerable true-time-delay phased array antenna suitable for future generation high-performance radars and other applications, such as satellite communications. Further, such optical time delay networks also have applications in all-optical multiplexing/demultiplexing of bit streams in ultrahigh bit-rate communications systems. See, e.g., E. Bodtker and J. E. Bowers, "Techniques for Optical Demultiplexing in High Bit Rate Communications Systems", *J. Lightwave Technology*, Vol. 13, pg. 1809, September 1995.

An excellent discussion of optical time delay networks and phased-array antennas utilizing the same can be found in I. Frigyes, A. J. Seeds, "Optically Generated True-Time Delay in Phased-Array Antennas", *IEEE Transactions on Microwave Theory and Techniques*, Vol. 43, No. 9, September 1995, and in M. Frankel, R. D. Esman, "True Time-Delay Fiber-Optic Control of an Ultrawideband Array Transmitter/Receiver with Multibeam Capability", *"IEEE Transactions on Microwave Theory and Techniques"*, Vol. 43, No. 9, September 1995. As discussed in the above-referenced articles, there are several types of optical time delay networks which have been proposed heretofore. The two principal types of optical time delay networks are discussed below.

A first principal type of optical time delay network utilizes a bank of optical fibers of different lengths which are selectively switched in or out of the feed network, by either electrical or optical switches, to thereby impart the desired time delay to the excitation signals fed to the respective antenna elements. If optical switches are employed, only a single optical source is required, whereas if electrical switches are employed, a separate optical source is required for each optical delay line. The primary drawbacks with this type of optical time delay network are complexity and optical losses (which necessitate the use of high optical power).

A second principal type of optical time delay network utilizes a wavelength tunable or addressable light source, e.g., a wavelength tunable laser, and a dispersive optical waveguide. Since the propagation time in a dispersive waveguide depends on wavelength, the time delay of the optical signal (lightwave) can be selectively varied by merely selectively changing the wavelength of the optical source, e.g., tuning a laser to a selected wavelength. The primary drawback with this type of optical time delay network is that kilometers of optical fiber are required to achieve time delay variability of a few nanoseconds. There are ways to increase fiber dispersion, but not by orders of magnitude, and thus, this type of optical tine delay network can not be made sufficiently compact for many applications. Further, the process of trimming long optical fibers with a high level of precision is also very difficult and labor intensive.

Based on the above and foregoing, it can be appreciated that there presently exists a need in the art for an optical time-delay network and phased array antenna incorporating the same which overcomes the above-described drawbacks and shortcomings of the presently available technology. The present invention fulfills this need in the art by providing a wavelength addressable optical time-delay network which is compact and in which the delay change is comparable to the absolute delay, unlike fiber propagation dispersion, where the absolute delay is many orders of magnitude greater than the delay changes.

SUMMARY OF THE INVENTION

The present invention encompasses, in one of its aspects, an optical switch network which includes a plurality N of cascaded optical switching stages, each mth one of the switching stages including $2^{m-1}$ Mach-Zehnder interferometers, wherein m=1 through N. Each of the Mach-Zehnder interferometers includes an input port and two output ports. The input port of the Mach-Zehnder interferometer of a first one (m=1) of the optical switching stages is disposed to receive an optical input signal, and the $2^{N-1}$ Mach-Zehnder interferometers of the Nth one of the optical switching stages provide a total of $2^N$ output ports. The input port of each of the Mach-Zehnder interferometers of each successive one of the optical switching stages except for the first one of the optical switching stages is optically coupled to a respective output port of a respective one of the Mach-Zehnder interferometers of a preceding one of the optical switching stages.

Preferably, each of the Mach-Zehnder interferometers is an unbalanced Mach-Zehnder interferometer, with the difference in length between the first and second parallel optical waveguides of each unbalanced Mach-Zehnder interferometer of each mth one of the optical switching stages being one-half the difference in length between the first and second parallel optical waveguides of each unbalanced Mach-Zehnder interferometer of the preceding (m−1th) one of the optical switching stages.

Further, the plurality N of cascaded optical switching stages provide $2^N$ possible optical paths, and the optical input signal preferably has a wavelength which is a selected one of $2^N$ selectable wavelengths, whereby the optical input signal is automatically routed along a selected one of the $2^N$ possible optical paths in dependence upon its selected wavelength.

The present invention also encompasses, in another of its aspects, an optical time delay network comprised of an optical switch network as described above, and a plurality $2^N$ of optical delay lines of different lengths coupled to respective ones of the $2^N$ output ports of the Nth one of the optical switching stages. Preferably, each of the optical delay lines is an optical waveguide having a light-reflecting end.

Preferably, the optical input signal has a wavelength which is a selected one of $2^N$ selectable wavelengths, whereby the optical input signal is automatically routed from the input port of the first one of the optical switching stages to a selected one of the $2^N$ output ports of the Nth one of the optical switching stages, and thence, into a respective one of the $2^N$ optical delay lines, in dependence upon its selected wavelength. Thus, the optical time delay is wavelength-addressable.

The present invention also encompasses, in yet another of its aspects, a phased array antenna which includes a plurality of optical time delay networks like the one described above, whereby a beam produced by the antenna elements of the phased array antenna has a beam angle which is a selected one of $2^N$ selectable beam angles, in dependence upon the wavelength of the optical input signal.

BRIEF DESCRIPTION OF THE DRAWINGS

These and other objects, features, and advantages of the present invention will become apparent from the following detailed description taken in conjunction with the accompanying drawings, in which.

DETAILED DESCRIPTION OF THE INVENTION

While the present invention is described herein with reference to an illustrative embodiment for a particular application, namely, a true-time-delay phased array antenna for future generation high-performance radar systems, it should be understood that the invention is not limited to either this particular embodiment or this particular application. Those having ordinary skill in the art and access to the teachings provided herein will recognize many additional modifications, applications, and embodiments within the scope thereof and additional fields in which the present invention would be of significant utility.

Figure 1:
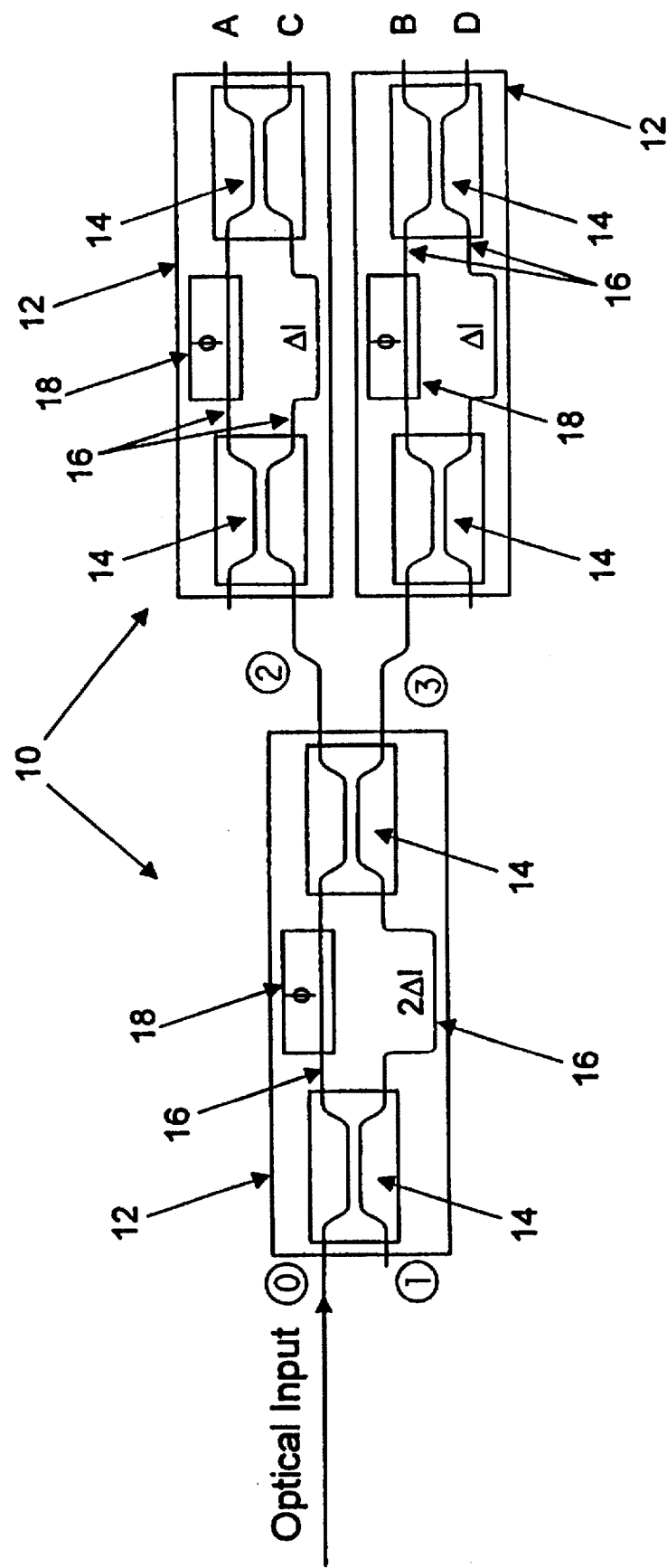
FIG. 1 is a partial schematic, partial block diagram of an illustrative embodiment of a wavelength-dependent optical switch network constructed in accordance with the teachings of the present invention.

With reference now to FIG. 1, there can be seen a wavelength-addressable or wavelength-dependent optical switch network 10 which embodies a first aspect of the present invention. The wavelength-dependent optical switch network 10 includes, in a presently preferred embodiment, a plurality N (where N≧2) of cascaded stages or tiers of unbalanced Mach-Zehnder (MZ) interferometers 12, with each mth tier including $2^{m-1}$ MZ interferometers 12, where m=1 through N. As is well-known to those skilled in the pertinent art, an unbalanced MZ interferometer is an MZ interferometer which provides a pair of parallel optical paths of different length, thereby creating a path length imbalance.

As can be seen in FIG. 1, each unbalanced MZ interferometer 12 includes two 3-dB optical couplers 14 connected by two parallel optical waveguides 16, with one of the optical waveguides 16 having a length which is greater than the length of the other one of the optical waveguides 16, to thereby provide a pair of parallel optical paths of different length. Preferably, the length difference between the optical waveguides 16 of the unbalanced MZ interferometers 12 of each mth tier is one-half (½) the length difference between the optical waveguides 16 of the unbalanced MZ interferometers 12 of the preceding (m−1th) tier. Preferably, each unbalanced MZ interferometer 12 further includes at least one variable phase shifter 18 disposed in one of its parallel optical paths to facilitate adjustment of the relative phases of the optical signals carried by the parallel optical waveguides 16, in order to achieve a desired Mach-Zehnder transmission function.

The wavelength-dependent optical switch network 10 of the illustrative embodiment depicted in FIG. 1 includes two (2) tiers of unbalanced MZ interferometers 12. Of course, it will be readily appreciated that the specific number of stages or tiers of unbalanced MZ interferometers 12 which are used is not limiting to the present invention. As shown, the length difference between the optical waveguides 16 of the unbalanced MZ interferometer 12 of the first tier is $2\Delta 1$, and the resultant path length imbalance is $2n\Delta 1$, and the length difference between the optical waveguides 16 of each of the two MZ interferometers 12 of the second tier is $\Delta 1$, and the resultant path length imbalance is $n\Delta 1$, where n is the effective refractive index of the optical waveguides 16.

Each unbalanced MZ interferometer 12 has an optical transmission function that is sinusoidal for optical signals of different wavelengths ($\lambda$). In general, for a path length imbalance of $1/(2^m n \Delta 1)$ (where m=tier number), the wavelength period of the sinusoid is $\lambda^2/(2^m n \Delta 1)$. Thus, the wavelength period of the sinusoid is fixed by the path imbalance $2^m n \Delta 1$ of the respective unbalanced MZ interferometer 12. However, the wavelength of maximum transmission of each unbalanced MZ interferometer 12 can be adjusted by selectively adjusting the relative phase $\phi$ using the variable phase shifter 18 thereof In general, the change in wavelength, which is proportional to $\phi$, is $\lambda^2 \phi/(2\pi 2^m n \Delta 1)$.

Figure 2:
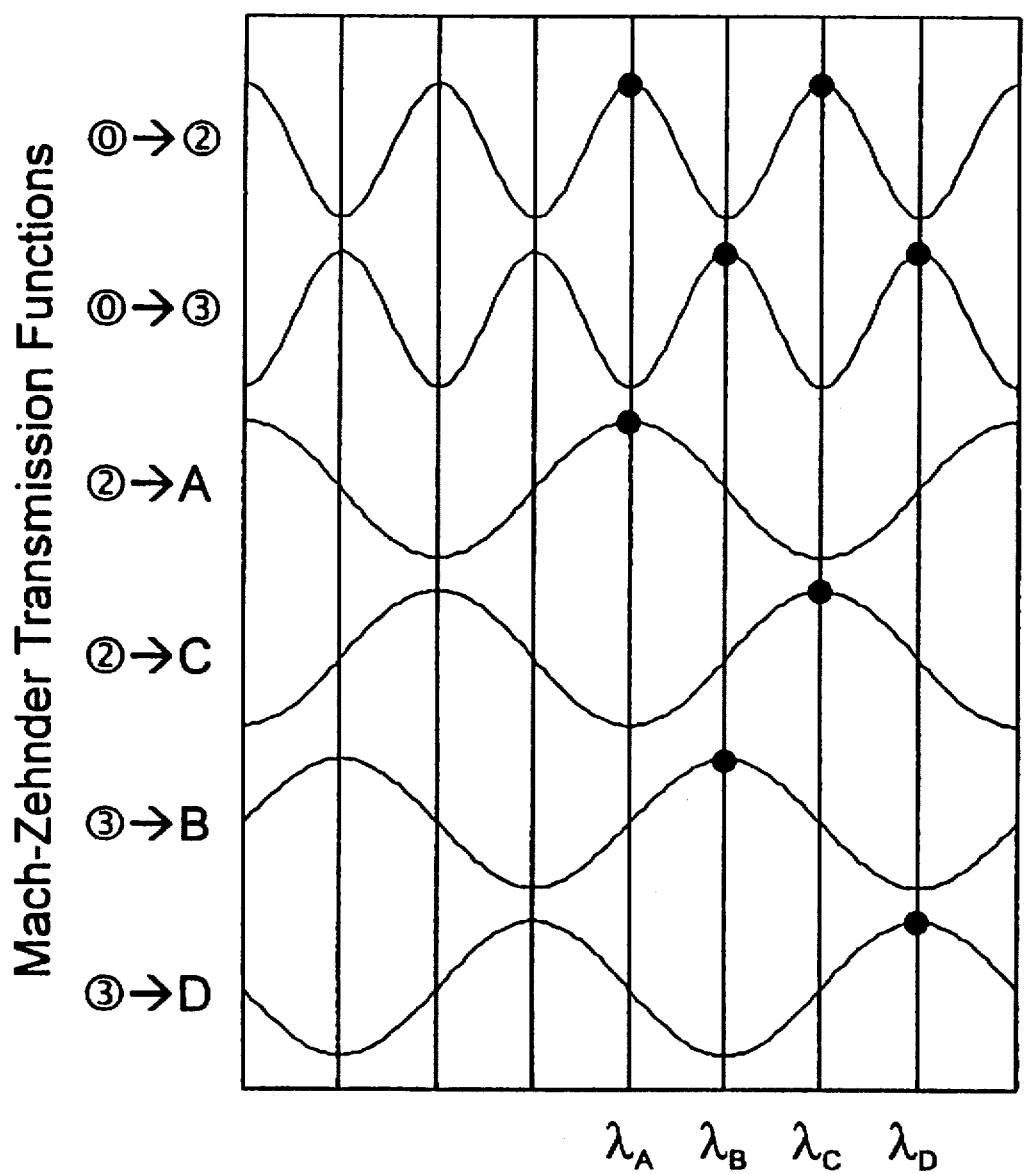
FIG. 2 is a diagram plotting the "Mach-Zehnder Transmission Functions" for the exemplary wavelength-dependent optical switch network depicted in FIG. 1.

With reference now to FIG. 2, there can be seen a diagram plotting the "Mach-Zehnder Transmission Functions" for optical signals of four different wavelengths ($\lambda_A$, $\lambda_B$, $\lambda_C$, and $\lambda_D$), via different input port-output port routes, namely, from port 0 to port 2 of the unbalanced MZ interferometer 12 of the first tier, from port 0 to port 3 of the unbalanced MZ interferometer 12 of the first tier, from port 2 to port A of a first one of the two unbalanced MZ interferometers 12 of the second tier, from port 2 to port C of the first one of the two unbalanced MZ interferometers 12 of the second tier, from port 3 to port B of a second one of the two unbalanced MZ interferometers 12 of the second tier, and from port 3 to port D of the second one of the two unbalanced MZ interferometers 12 of the second tier. For example, as indicated by the solid black dots in the diagram, an optical signal having a wavelength $\lambda_A$ is routed from port 0 to port 2, and then from port 2 to port A.

Figure 3:
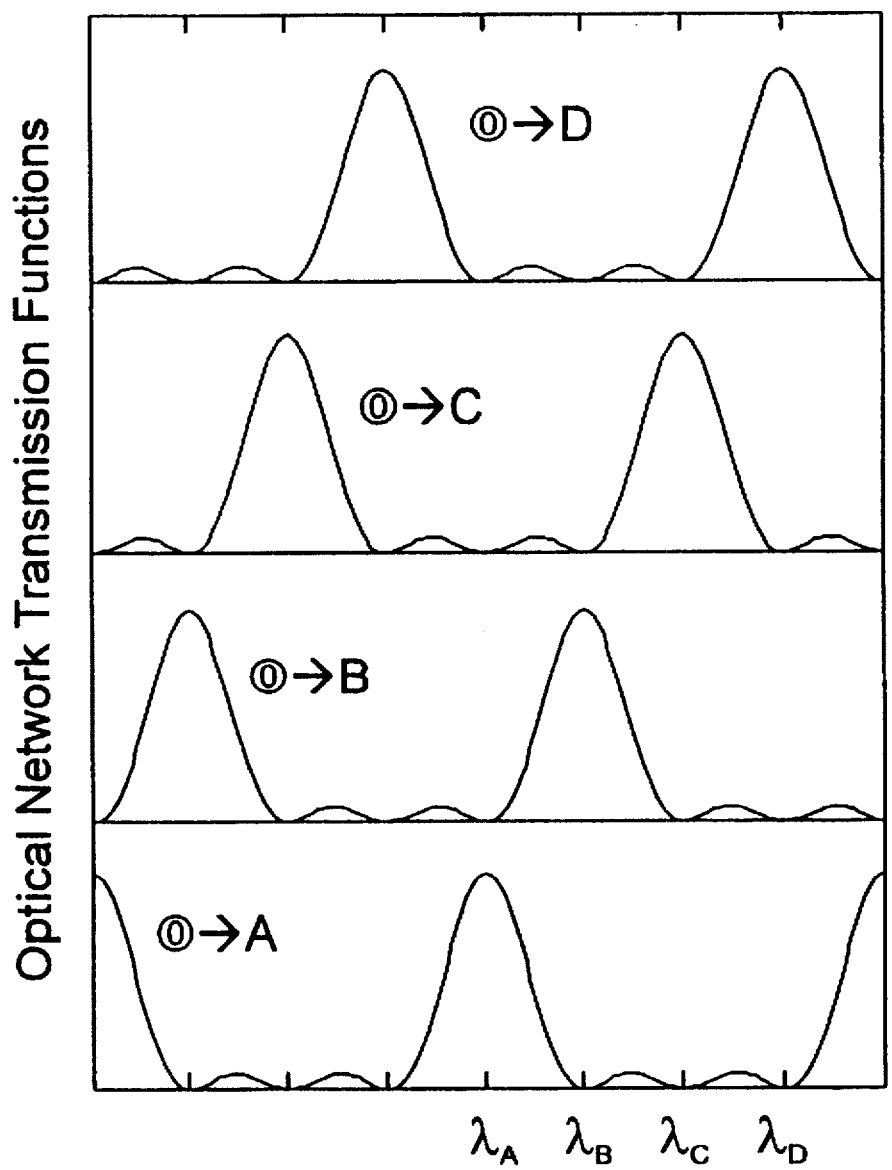
FIG. 3 is an "Optical Network Transmission Functions" diagram which depicts the total transmission versus wavelength for the exemplary wavelength-dependent optical switch network depicted in FIG. 1.

With additional reference now to FIG. 3, there can be seen an "Optical Network Transmission Functions" diagram which depicts the total transmission vs. wavelength through the exemplary two-tier wavelength-dependent optical switch network 10 depicted in FIG. 1. As can be readily seen, an optical input signal having a wavelength $\lambda_A$ is routed from port 0 to port A, an optical input signal having a wavelength $\lambda_B$ is routed from port 0 to port B, an optical input signal having a wavelength $\lambda_C$ is routed from port 0 to port C, and an optical input signal having a wavelength $\lambda_D$ is routed from port 0 to port D.

Thus, each tier of the optical wavelength-dependent switch network 10 functions as a passive wavelength-dependent optical switch, with the result being that the overall network 10 functions as a wavelength-dependent optical switch network, since the routing of an optical input signal through the network is dependent upon its wavelength. Thus, the routing of the optical input signal can be easily and rapidly switched by simply changing the wavelength of the optical input signal. For example, as will be further developed hereinafter, if the optical input signal is generated by a wavelength-tunable laser, a $\lambda$-select control signal generated by control electronics can be used to tune (or switch) the laser to a different wavelength, in a manner well-known in the pertinent art.

In a presently preferred embodiment of the present invention, the wavelength-dependent optical switch network 10 is employed as a component of an optical time delay network which further includes a plurality $2^N$ of optical delay lines of different lengths coupled to respective ports of the final tier of the wavelength-dependent optical switch network 10. For example, if the two-tier (N=2) wavelength-dependent optical switch network 10 of the illustrative embodiment depicted in FIG. 1 is employed, then four (4) optical delay lines are utilized.

Figure 4:
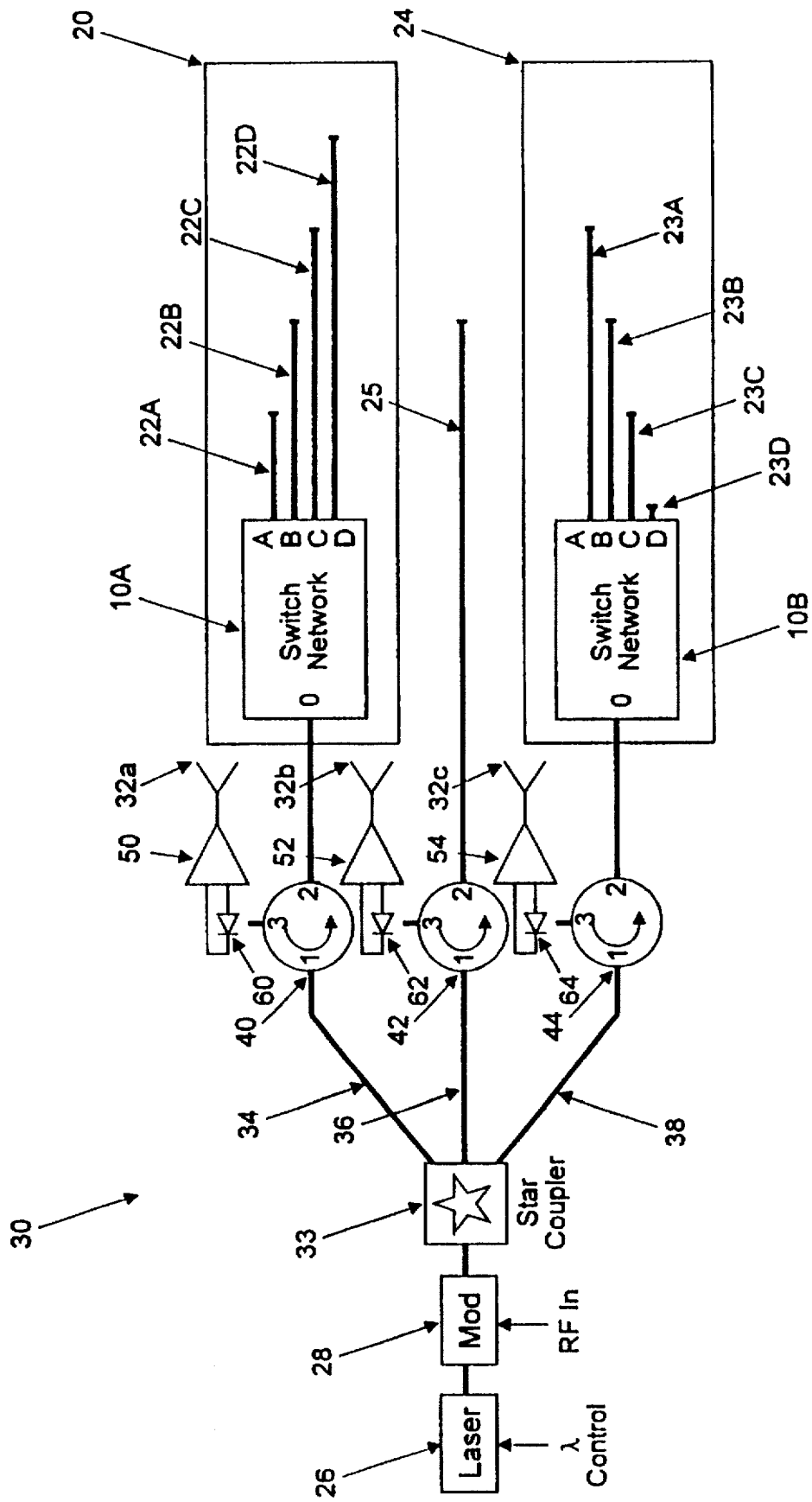
FIG. 4 is a partial schematic, partial block diagram of an illustrative embodiment of a phased array antenna constructed in accordance with the teachings of the present invention; and, FIG. 5 is a diagram which illustrates different beam angles which can be achieved with the exemplary phased array antenna depicted in FIG. 4.

With reference now to FIG. 4, the present invention, in another of its aspects, encompasses a true-time-delay phased array antenna 30 which includes a plurality of optical time delay networks constructed in accordance with the first aspect of the present invention, as described above, and a plurality X of antenna elements. In the illustrative embodiment depicted in FIG. 4, the phased array antenna 30 includes three (X=3) antenna elements 32a–32c, a first optical time delay network 20, and a second second optical time delay network 24.

The first optical time delay network 20 includes a wavelength-dependent optical switch network 10A which has four (4) output ports, A–D, coupled to four (4) respective optical delay lines 22A–22D of different lengths, e.g., four precisely cut optical fibers. The second optical time delay network 24 includes a wavelength-dependent optical switch network 10 which has four (4) output ports, A–D, coupled to four (4) respective optical delay lines 23A–23D of different lengths, e.g., four precisely cut optical fibers.

The phased array antenna 30 further includes a wavelength-selectable optical source, e.g., a wavelength-tunable laser 26, whose laser light output is modulated by a modulator 28, e.g., an acousto-optic or electro-optic modulator of any convenient type. (Alternatively, the laser 26 could be of a type which can be directly modulated, thereby eliminating the need for the modulator 28.) The wavelength $\lambda$ of the laser light output can be selectably varied by means of a "$\lambda$-control" signal or in any other convenient manner well-known in the pertinent art. The modulator 28 can be driven by any convenient modulating signal, e.g., a pulsed or non-pulsed microwave or millimeter-wave RF signal ("RF In"), to thereby produce at its output an RF-modulated optical signal (lightwave), which is then split into X identical components or replicas by a 1-to-X optical splitter or coupler, e.g., a star coupler 33.

The X replicated RF-modulated optical signals are coupled over respective optical waveguides 34, 36, and 38 (e.g., separate optical fibers or branches of a common optical fiber trunk) to a first port 1 of respective optical circulators 40, 42, 44, respectively. As indicated by the directional arrows, the RF-modulated optical signals are routed in a counter-clockwise direction by the circulators 40, 42, and 44, so that they exit a second port 2 thereof. The RF-modulated optical signals exiting the second port 2 of the circulators 40, 42, and 44 are optically coupled to the first optical time delay network 20, an optical waveguide 25, and the second optical time delay network 24, respectively. The particular route which the RF-modulated optical signals take through the first and second optical time delay networks 20, 24 is dependent upon the wavelength thereof, as described hereinabove.

For example, if the wavelength is $\lambda_A$, then the RF-modulated optical signal which is output by the circulator 40 will be routed from port 0 to port A of the wavelength-dependent optical switch network 10A and thence, into the optical waveguide 22A. The RF-modulated optical signal is then reflected from the end of the optical waveguide 22A back through the wavelength-dependent optical switch network 10A and into port 2 of the circulator 40, from which it will exit via port 3 of the circulator 40 to illuminate a corresponding photodiode 60 (or any other convenient photosensitive element), which opto-electronically converts the RF-modulated optical signal to RF electrical energy which, after being amplified by a power amplifier 50, excites the corresponding antenna element 32a.

Similarly, if the wavelength is $\lambda_A$, then the RF-modulated optical signal which is output by the circulator 44 will be routed from port 0 to port A of the wavelength-dependent optical switch network 10B and thence, into the optical waveguide 23A. The RF-modulated optical signal is then reflected from the end of the optical waveguide 23A back through the wavelength-dependent optical switch network 10B and into port 2 of the circulator 44, from which it will exit via port 3 of the circulator 44 to illuminate a corresponding photodiode 64 (or any other convenient type of light detector), which opto-electronically converts the RF-modulated optical signal to RF electrical energy which, after being amplified by a power amplifier 54, excites the corresponding antenna element 32c.

Figure 5:
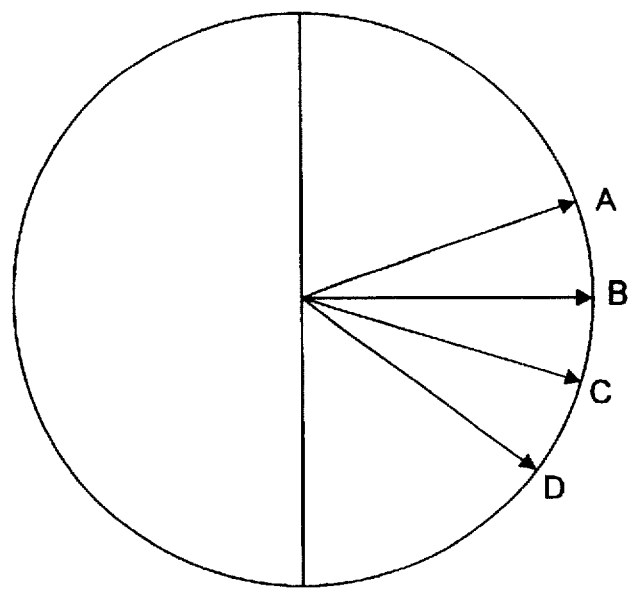

With additional reference now to FIG. 5, there can be seen a diagram which illustrates the four different beam angles A, B, C, D which can be achieved with the phased array antenna 30 of the illustrative embodiment depicted in FIG. 4. As will be readily evident to those skilled in the pertinent art, with the phased array antenna 30 of the illustrative embodiment depicted in FIG. 4, the beam angle of the beam(s) formed by the antenna elements 32a–32c can be simply and rapidly varied by simply varying the wavelength of the light output by the laser (or other light source) 26. More particularly, if a wavelength $\lambda_A$ is selected, then the beam angle A will be realized, if a wavelength $\lambda_B$ is selected, then the beam angle B will be realized, if a wavelength $\lambda_C$ is selected, then the beam angle C will be realized, and if a wavelength $\lambda_D$ is selected, then the beam angle D will be realized. Thus, the beam angle is wavelength-addressable in the same manner that the optical time delay network is wavelength-addressable. In general, the number of beam angles which are selectable is $2^N$, which is the same as the number $2^N$ of selectable time delays for each antenna element in the phased array antenna which is fed by the optical time delay network of the present invention.

Although illustrative and preferred embodiments of various aspects of the present invention have been described in detail hereinabove, it should be clearly understood that many variations and/or modifications of the basic inventive concepts herein taught which may appear to those skilled in the pertinent art will still fall within the spirit and scope of the present invention as defined in the appended claims.

For example, although the optical switch network 10 depicted in FIG. 1, and the optical switch networks 10A and 10B depicted in FIG. 4 are intended to be wavelength-addressable after initially setting the switch phases ($\phi$'s), other variations of this scheme are also possible. For example, balanced MZ interferometers having equal length parallel optical paths (i.e., $\Delta l=0$) can be used in lieu of unbalanced MZ interferometers, whereby any optical input signal can be routed to any output port by adjusting the $\phi$'s, independent of the wavelength of the optical input signal. Alternatively, simultaneous wavelength filtering and switching can be implemented using the original, unbalanced MZ interferometers by dynamically adjusting the $\phi$'s. This capability of being operated in wavelength-addressable or non-dispersive switched modes provides a level of flexibility not available with presently known systems.

Further, as will be readily apparent to those skilled in the pertinent art, all of the network components described hereinabove can be implemented in bulk optics, with integrated optical components, or with discrete fiber-optic components, or some combination of the above. However, a mostly integrated optical implementation is preferred, e.g., using glass, $LiNbO_3$, semiconductor, or other integrated optical waveguide technology.

Also, it will be readily appreciated by those skilled in the art that the present invention also encompasses an optical switch network and phased array antenna incorporating the same, in which a single MZ interferometer is used (i.e., N=1), albeit that this implementation would limit the number of selectable time delay options to two (2). Moreover, it will also be readily appreciated by those skilled in the art that the first 3-dB optical coupler of each MZ interferometer can be replaced by a Y-branch splitter, or any other convenient type of light distribution device having one input and at least two outputs, since only one of the input ports of the first 3-dB optical coupler of each MZ interferometer is used in the presently preferred embodiment of the present invention. Moreover, it will also be readily apparent to those skilled in the art that the circulators can be replaced by any other convenient type of light directing device.

Further, rather than the reflection type of optical time delay network of the illustrative embodiment described hereinabove, a transmission type of optical time delay network can be used in which the optical delay lines which have light-reflecting ends are replaced by optical delay lines which do not have light-reflecting ends, and in which the respective light detectors, amplifiers, and antenna elements are coupled to the ends of the optical delay lines, rather than being coupled to the third ports of the respective circulators.

In any event, a true-time-delay phased array antenna incorporating the optical time delay network of the present invention is suitable for use in future generation high-performance broadband radar systems which require rapid and accurate pointing. Further, the wavelength-addressable optical switch network and wavelength-addressable optical time delay network of the present invention, as well as the phased array antenna incorporating the same, are compact, versatile, and inherently mechanically and thermally stable.

What is claimed is:

1. An optical switch network, comprising:
   a number N of cascaded optical switching stages, each mth one of said switching stages including $2^{m-1}$ unbalanced Mach-Zehnder interferometers, wherein m=1 through N, and N≧2;

wherein each of said Mach-Zehnder interferometers includes an input port and two output ports, and first and second 3 dB optical couplers optically coupled by first and second parallel optical waveguides of different length;

wherein said input port of the Mach-Zehnder interferometer of a first one of said optical switching stages is disposed to receive an optical input signal;

wherein the $2^{N-1}$ Mach-Zehnder interferometers of the Nth one of said optical switching stages provide a total of $2^N$ output ports; and, wherein said input port of each of the Mach-Zehnder interferometers of each successive one of said optical switching stages except said first one of said optical switching stages is optically coupled to a respective output port of a respective one of the Mach-Zehnder interferometers of a preceding one of said optical switching stages.

2. The optical switch network as set forth in claim 1, wherein the difference in length between said first and second parallel optical waveguides of each unbalanced Mach-Zehnder interferometer of each mth one of said optical switching stages is one-half the difference in length between said first and second parallel optical waveguides of each unbalanced Mach-Zehnder interferometer of the preceding (m−1th) one of said optical switching stages.

3. The optical switch network as set forth in claim 2, wherein:

said N cascaded optical switching stages provide $2^N$ possible optical paths;

said optical input signal has a wavelength which is a selected one of $2^N$ selectable wavelengths; and, said optical input signal is automatically routed along a selected one of said $2^N$ possible optical paths in dependence upon its selected wavelength.

4. The optical switch network as set forth in claim 1, wherein each of said Mach-Zehnder interferometers includes a variable phase shifter device disposed in at least one of said first and second parallel optical waveguides.

5. An optical time delay network, comprising:

an optical switching network comprised of a number N of cascaded optical switching stages, each mth one of said switching stages including $2^{m-1}$ Mach-Zehnder interferometers, wherein m=1 through N, and N≧1;

wherein each of said Mach-Zehnder interferometers includes an input port and two output ports;

wherein said input port of the Mach-Zehnder interferometer of a first one of said optical switching stages is disposed to receive an optical input signal;

wherein the $2^{N-1}$ Mach-Zehnder interferometers of the Nth one of said optical switching stages provide a total of $2^N$ output ports;

wherein said input port of each of the Mach-Zehnder interferometers of each successive one of said optical switching stages except said first one of said optical switching stages is optically coupled to a respective output port of a respective one of the Mach-Zehnder interferometers of a preceding one of said optical switching stages; and, a plurality $2^N$ of optical delay lines of different lengths coupled to respective ones of said $2^N$ output ports of said Nth one of said optical switching stages.

6. The optical time delay network as set forth in claim 5, wherein each of said Mach-Zehnder interferometers comprises an unbalanced Mach-Zehnder interferometer.

7. The optical time delay network as set forth in claim 6, wherein each of said unbalanced Mach-Zehnder interferometers includes first and second 3 dB optical couplers optically coupled by first and second parallel optical waveguides of different length.

8. The optical time delay network as set forth in claim 5, wherein each of said optical delay lines is comprised of an optical waveguide having a light-reflecting end.

9. The optical time delay network as set forth in claim 5, wherein:

said optical input signal has a wavelength which is a selected one of $2^N$ selectable wavelengths; and, said optical input signal is automatically routed from said input port of said first one of said optical switching stages to a selected one of said $2^N$ output ports of said Nth one of said optical switching stages, and thence, into a respective one of said $2^N$ optical delay lines, in dependence upon its selected wavelength, whereby said optical time delay network is wavelength-addressable.

10. The optical time delay network as set forth in claim 5, wherein:

N≧2;

each of said Mach-Zehnder interferometers comprises an unbalanced Mach-Zehnder interferometer which includes first and second parallel optical waveguides of different length; and, the difference in length between said first and second parallel optical waveguides of each unbalanced Mach-Zehnder interferometer of each mth one of said optical switching stages is one-half the difference in length between said first and second parallel optical waveguides of each unbalanced Mach-Zehnder interferometer of the preceding (m−1th) one of said optical switching stages.

11. An antenna, comprising:

an antenna element;

an optical switching network comprised of a number N of cascaded optical switching stages, each mth one of said switching stages including $2^{m-1}$ Mach-Zehnder interferometers, wherein m=1 through N, and N≧1;

wherein each of said Mach-Zehnder interferometers includes an input port and two output ports;

wherein said input port of the Mach-Zehnder interferometer of a first one (m=1) of said optical switching stages is disposed to receive an optical input signal;

wherein the $2^{N-1}$ Mach-Zehnder interferometers of the Nth one of said optical switching stages provide a total of $2^N$ output ports;

wherein said input port of each of the Mach-Zehnder interferometers of each successive one of said optical switching stages except said first one of said optical switching stages is optically coupled to a respective output port of a respective one of the Mach-Zehnder interferometers of a preceding one of said optical switching stages;

a plurality $2^N$ of optical delay lines of different lengths coupled to respective ones of said $2^N$ output ports of said Nth one of said optical switching stages;

an optical directing device for receiving said optical input signal and for directing said optical input signal to said input port of said Mach-Zehnder interferometer of said first one of said optical switching stages; and, a photosensitive device electrically coupled to said antenna element and disposed to receive the light output by a selected one of said optical delay lines, and to convert the received light to RF energy for exciting said antenna element.

12. The antenna as set forth in claim 11, wherein:

said optical input signal has a wavelength which is a selected one of $2^N$ selectable wavelengths;

each of said Mach-Zehnder interferometers comprises an unbalanced Mach-Zehnder interferometer which includes first and second parallel optical waveguides of different length; and, said optical input signal is automatically routed from said input port of said first one of said optical switching stages to a selected one of said $2^N$ output ports of said Nth one of said optical switching stages, and thence, into a respective one of said $2^N$ optical delay lines, in dependence upon its selected wavelength, whereby a beam produced by said antenna element has a beam angle which is a selected one of $2^N$ selectable beam angles, in dependence upon which of said optical delay lines said optical input signal is automatically routed into.

13. The antenna as set forth in claim 12, wherein:

$N \geq 2$;

each of said Mach-Zehnder interferometers comprises an unbalanced Mach-Zehnder interferometer which includes first and second parallel optical waveguides of different length; and, the difference in length between said first and second parallel optical waveguides of each unbalanced Mach-Zehnder interferometer of each mth one of said optical switching stages is one-half the difference in length between said first and second parallel optical waveguides of each unbalanced Mach-Zehnder interferometer of the preceding (m−1th) one of said optical switching stages.

14. The antenna as set forth in claim 13, wherein:

each of said optical delay lines is comprised of an optical waveguide having a light-reflecting end; and, said optical directing device is disposed to direct light reflected by said light-reflecting end of said selected one of said optical delay lines to said photosensitive device.

15. The antenna as set forth in claim 11, wherein:

each of said optical delay lines comprises an optical waveguide having a light-reflecting end;

said optical directing device comprises a circulator having first, second, and third ports, said first port being disposed to receive said optical input signal, said second port being disposed to receive light reflected by said light-reflecting end of said selected one of said optical delay lines, and said third port being disposed to output the reflected light received by said second port; and, said photosensitive device is disposed to receive the light output through said third port of said circulator.

16. The antenna as set forth in claim 11, further comprising:

a wavelength-selectable optical source for producing an optical signal having a selected one of said $2^N$ wavelengths; and, a modulator responsive to an input RF signal for modulating said optical signal produced by said wavelength-selectable optical source, for producing an RF-modulated optical signal, wherein said RF-modulated optical signal comprises said optical input signal.

17. The antenna as set forth in claim 11, further comprising an amplifier coupled between said photosensitive device and said antenna element.

18. The antenna as set forth in claim 11, further comprising:

a plurality of additional antenna elements, wherein said additional antenna elements and said antenna element are configured in an array;

a plurality of additional optical switching networks each having N optical switching stages;

means for splitting said optical input signal into a plurality of replica optical input signals corresponding in number to the total number of antenna elements;

a plurality of additional optical directing devices each for receiving a respective one of said replica optical input signals and for directing said respective one of said replica optical input signals to said input port of said Mach-Zehnder interferometer of a first one of said optical switching stages of a respective one of said additional optical switching networks; and, a plurality of additional photosensitive devices electrically coupled to respective ones of said additional antenna elements and disposed to receive light output by a selected one of said optical delay lines of a respective one of said additional optical switching networks, and to convert the received light to RF energy for exciting said respective one of said additional antenna elements.

* * * * *